US007270010B2

(12) United States Patent
Kaneko et al.

(10) Patent No.: US 7,270,010 B2
(45) Date of Patent: Sep. 18, 2007

(54) SYSTEM AND METHOD FOR PRESSURE MEASUREMENT (75) Inventors: Yoshikazu Kaneko, Chikuma (JP);
Shuji Shimada, Nagano (JP); Ikuhiro Yanagisawa, Ueda (JP); Yoshinori Wada, Maruko-machi (JP); William Stephen Kosh, Shelton, UT (US); William J. Loxsom, Stratford, CT (US)

(73) Assignee: Ashcroft-Nagano, Inc., Stratford, CT (US)

( * ) Notice: Subject to any disclaimer, the term of this patent is extended or adjusted under 35 U.S.C. 154(b) by 0 days.

(21) Appl. No.: 10/928,024

(22) Filed: Aug. 27, 2004

(65) Prior Publication Data
US 2006/0042393 A1    Mar. 2, 2006

(51) Int. Cl.
*G01L 9/00* (2006.01)
(52) U.S. Cl. ........................................... 73/753
(58) Field of Classification Search .............. 73/756, 73/720, 715, 753, 754
See application file for complete search history.

(56) References Cited

U.S. PATENT DOCUMENTS

| | | | | |
|---|---|---|---|---|
| 5,317,923 | A * | 6/1994 | Erichsen et al. | 73/727 |
| 5,587,535 | A * | 12/1996 | Sasaki et al. | 73/726 |
| 5,880,372 | A | 3/1999 | Nasiri | |
| 6,089,106 | A * | 7/2000 | Patel et al. | 73/862.582 |
| 6,374,679 | B1 * | 4/2002 | Babala et al. | 73/715 |
| 6,453,747 | B1 * | 9/2002 | Weise et al. | 73/715 |
| 6,578,426 | B2 * | 6/2003 | Imai et al. | 73/720 |
| 6,584,851 | B2 * | 7/2003 | Yamagishi et al. | 73/715 |
| 6,643,380 | B2 * | 11/2003 | Rodemer | 381/369 |
| 6,722,205 | B2 * | 4/2004 | Bodin | 73/756 |
| 6,742,395 | B1 * | 6/2004 | Borgers et al. | 73/717 |
| 6,769,308 | B1 * | 8/2004 | Pitzer | 73/715 |
| 6,782,758 | B2 * | 8/2004 | Weise | 73/756 |
| 6,907,789 | B2 * | 6/2005 | Bodin | 73/753 |
| 2004/0079148 | A1 * | 4/2004 | Sandford et al. | 73/168 |

(Continued)

FOREIGN PATENT DOCUMENTS

EP    0 995 979    4/2000

(Continued)

OTHER PUBLICATIONS

International Search Report, PCT/US2005/030297, Dec. 14, 2005, pp. 1-3.

*Primary Examiner*—Max Noori
(74) *Attorney, Agent, or Firm*—Fish & Richardson P.C.

(57) ABSTRACT

A pressure measurement system may provide ready manufacturing, reliable operation, and/or enhanced performance by using a circuit board housing. In particular implementations, a pressure measurement system includes a pressure inlet joint, a pressure detecting component, a circuit board, and a circuit board housing. The pressure detecting component is coupled to the pressure inlet joint, which is adapted to introduce a pressure of a fluid. The circuit board is coupled to the pressure detecting component and is operable to condition an electrical signal from the pressure detecting component. The circuit board housing at least partially encloses the pressure detecting component and is adapted to engage the circuit board. The circuit board housing has a substantially cylindrical shape and includes a larger diameter section and a smaller diameter section, the smaller diameter section coupled to the pressure inlet joint, the circuit board located at least in part in the larger diameter section.

31 Claims, 5 Drawing Sheets

U.S. PATENT DOCUMENTS

2004/0180579 A1* 9/2004 Glasson .................. 439/610
2005/0072245 A1* 4/2005 Ernsberger et al. .......... 73/753
2005/0204823 A1* 9/2005 Murai ..................... 73/724
2005/0230768 A1* 10/2005 Mei ....................... 257/415

FOREIGN PATENT DOCUMENTS

| EP | 1 211 496 | 6/2002 |
| EP | 1 382 953 | 1/2004 |
| JP | H06-078836 | 11/1994 |
| JP | 08-292118 | 11/1996 |
| JP | 2001-208633 | 8/2001 |
| JP | 3440629 B | 6/2003 |

\* cited by examiner

SYSTEM AND METHOD FOR PRESSURE MEASUREMENT

FIELD OF THE INVENTION

The present invention relates to process management and, more specifically, to pressure measurement.

BACKGROUND

In the structure of a pressure sensor based on the conventional technology as disclosed, for instance, in Japanese Patent Publication No. 3,440,629, an amplifying circuit board is directly fixed to a body with adhesive, as described on page 4 and shown in FIGS. 1-3 of the publication. The adhesive may be a silicone adhesive. A shield member having a feed-through capacitor is placed on the amplifying circuit board so as to cover the amplifying circuit board, and the shield member is fixed, together with a fixing member, to the body by laser welding or resistance welding techniques so that noise resistance is improved.

In U.S. Pat. No. 5,880,372, a printed circuit board is fixed to a spacer made of an electrically insulating material, such as resin, provided on a pressure port by soldering techniques, as described on page 2 and shown in FIG. 2A of the patent. An interlock provided on the spacer is engaged to an interlock receiver (hole) provided on the pressure port for positioning in the rotational direction together with a ground log. To improve noise resistance, an electrical connection is achieved by press-fitting a ground line of the printed circuit board from the spacer into a case ground contact (hole) provided on the pressure port via the ground log. After components on the printed circuit board are assembled, a downward force is loaded by caulking so that the spacer is fixed.

In Japanese Laid-Open Patent Publication No. 2001-208633, the amplifying circuit board is fixed to a terminal base made of resin by soldering, as described on page 8 and shown in FIGS. 1-6 of the publication. The terminal has a plurality of convex sections in the upper side, and the convex sections are engaged with a concave section provided on the plate to be fixed thereto. A shield case is fixed to a terminal base by inserting and caulking an opening peripheral edge thereof into a concave section provided on an external peripheral surface and is electrically connected to an external metallic case via an elastic piece provided on the opening peripheral edge, as shown in FIG. 8 of the publication, for improving the noise resistance.

In Japanese Utility Model Laid-Open Publication No. HEI 6-78836, the amplifying circuit board is fixed by adhesive filled in the groove provided on the case, as described on page 2 and shown on FIG. 2 of the publication. A plate is contacted and electrically connected to the case by caulking via a sub-connector and a connector for improving the noise resistance.

SUMMARY

A pressure measurement system may include a housing for a circuit board that conditions the output signal of a pressure detecting component. The housing may provide ease and reliability in manufacturing and use. Furthermore, the housing may provide enhanced performance.

In one general aspect, a pressure measurement system includes a pressure inlet joint, a pressure detecting component, a circuit board, and a circuit board housing. The pressure detecting component is coupled to the pressure inlet joint, which is adapted to introduce a pressure of a fluid. The circuit board is coupled to the pressure detecting component and is operable to condition an electrical signal from the pressure detecting component. The circuit board housing at least partially encloses the pressure detecting component and is adapted to engage the circuit board. Additionally, the circuit board housing has a substantially cylindrical shape and includes a larger diameter section and a smaller diameter section. The smaller diameter section coupled to the pressure inlet joint. The circuit board is located, at least in part, in the larger diameter section.

The circuit board housing may include a number of columns formed substantially parallel to the longitudinal axis of the circuit board housing, each column including a cover, which may engage the circuit board. The columns may be substantially semi-cylindrical and extend from the smaller diameter section toward the larger diameter section.

In certain implementations, a projection may be formed on the cover of at least one column and be adapted to be coupled to the circuit board, and, in others, a number of projections may be formed on the covers of the columns, the projections being arranged at unequal intervals around the cylinder. One or more projections may be electrically coupled to a ground line of the circuit board and/or to the pressure inlet joint.

The circuit board housing may be coupled to the pressure inlet joint at a number of point by spot welding. In one implementation, at least part of the longitudinal portion of the smaller diameter section engages the pressure inlet joint, and the welds occur in this part.

In particular implementations, the pressure measurement system may include an electrical connector electrically coupled to the circuit board for connection to an external device. The pressure measurement system may also include a second housing at least partially enclosing the circuit board housing, the second housing coupled to the pressure inlet joint.

In another general aspect, a circuit board housing for a pressure measurement system is adapted to at least partially enclose a pressure detecting component and to engage a circuit board, the circuit board housing having a substantially cylindrical shape and comprising a larger diameter section and a smaller diameter section, the smaller diameter section adapted to couple to a pressure inlet joint.

The circuit board housing may include a number of columns formed substantially parallel to the longitudinal axis of the circuit board housing, each column including a cover. The columns may be substantially semi-cylindrical and extend from the smaller diameter section toward the larger diameter section, and the covers of the columns may be adapted to engage with a circuit board. A projection may be formed on the cover of at least one column and be adapted to be coupled to a circuit board. The projection may also be adapted to be electrically coupled to a ground line of a circuit board.

In yet another general aspect, a pressure measurement system includes a pressure inlet joint, a pressure detecting component, a circuit board, and a circuit board housing. The pressure inlet joint is adapted to introduce a pressure of a fluid, and the pressure detecting component is coupled to the pressure inlet joint. The circuit board is coupled to the pressure detecting component and is operable to amplify an electrical signal from the pressure detecting component. The circuit board housing partially encloses the pressure detecting component and is adapted to engage the circuit board. Also, the circuit board housing has a substantially cylindrical shape and includes a larger diameter section, a smaller diameter section, and a number of substantially semi-cylindrical columns. The smaller diameter section is coupled to the pressure inlet joint at a number of points by spot welding, at least part of the longitudinal portion of the smaller diameter section engaging the pressure inlet joint around the welds. The columns are formed substantially parallel to the longitudinal axis of the circuit board housing and extend from the smaller diameter section toward the larger diameter section. Each column includes an upper cover having a projection formed thereon to couple to the circuit board, the circuit board held on the upper covers of the columns in the larger diameter section by the projections, which are spaced at unequal intervals around the cylinder. At least one projection is also electrically coupled to a ground line of the circuit board and to the pressure inlet joint. The pressure measurement system also includes a housing and an electrical connector. The housing partially encloses the circuit board housing and is coupled to the pressure inlet joint. The electrical connector is electrically coupled to the circuit board for connection to an external device.

Various implementations may have a variety of features. For example, particular implementations may provide a highly reliable pressure sensor having a simple structure that securely holds a signal conditioning circuit board, requires only a few assembly operations, and shows at most minimal change in noise-resistance property over time.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

A system for pressure measurement may generate an electrical signal representative of the measured pressure. In particular implementations, a system for pressure measurement may include a pressure detecting component, a pressure inlet joint for introducing a pressure of a fluid, a circuit board for conditioning an electrical signal from the pressure detecting component, a circuit board housing at least partially surrounding the pressure detecting component and adapted to engage the circuit board, an electrical connector electrically coupled to the circuit board to provide electrical coupling to an external device, and a housing at least partially enclosing the circuit board housing and coupled to the pressure inlet joint. Other implementations, however, may have fewer, additional, and/or a different arrangement of components.

Figure 1:
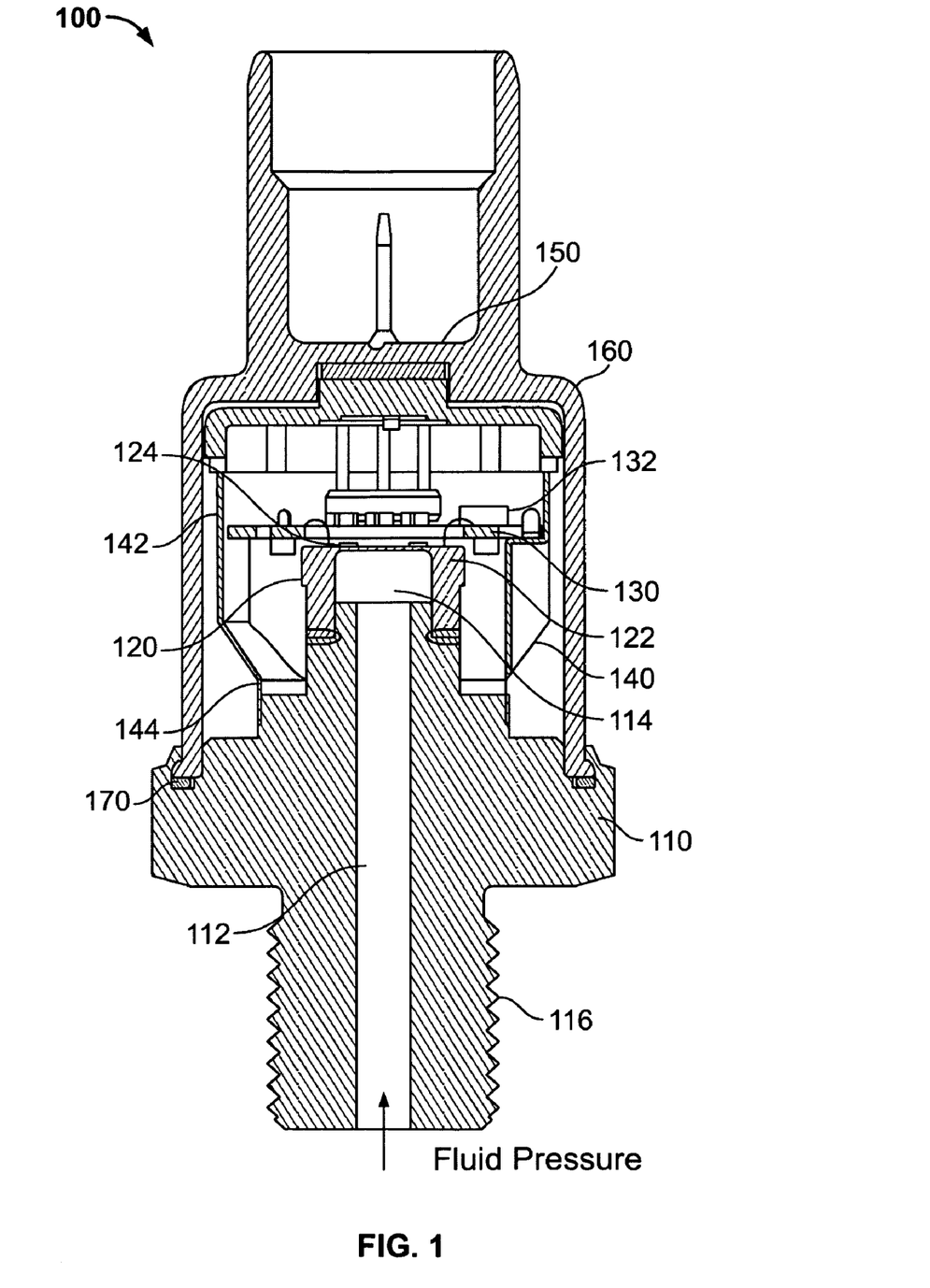
FIG. 1 is a cross-sectional view showing an example pressure measurement system.

FIG. 1 illustrates an example pressure measurement system 100. As illustrated, pressure measurement system 100 is a pressure sensor. Pressure measurement system 100 may measure the pressure of any appropriate fluid (e.g., liquid and/or gas).

Pressure measurement system 100 includes a pressure inlet joint 110, a pressure detecting component 120, and a circuit board 130. Pressure inlet joint 110, which in certain implementations may be a socket, includes a passage 112 that ends in a chamber 114 formed by the pressure inlet joint and pressure detecting component 120. Pressure inlet joint also include threads 116 for securing system 100 to a process for which pressure is to be measured. In particular implementations, pressure inlet joint 110 may be composed of stainless steel having high mechanical strength and corrosion-resistance. Pressure detecting component 120 includes a diaphragm 122, which may have a substantially cylindrical bottom. Diaphragm 122 may be metallic and has a strain gauge 124 formed on a surface opposite of the fluid-inlet side. In particular implementations, strain gauges are provided at a number of locations (e.g., four) to form a bridge circuit and output an electric signal. Pressure detecting component 120 is coupled (e.g., fixed and sealed) to pressure inlet joint 110 (e.g., by welding). Circuit board 130 is electrically coupled to pressure detecting component 120 and conditions signals representative of pressure that the pressure detecting component generates. Circuit board 130 includes various electronic components 132 (e.g., filters, amplifiers, and processors) to condition the pressure-representative signals.

Pressure measurement system 100 also includes a circuit board housing 140 (e.g., a shield case) that engages circuit board 130. As illustrated, circuit board housing 140 is substantially cylindrical and has a larger diameter section 142 and a smaller diameter section 144, the smaller diameter section being coupled to pressure inlet joint 110. Smaller diameter section 144 may be coupled (e.g., by resistance or laser welding) to pressure inlet joint 110 at multiple points. Larger diameter section 142 is adapted to couple to circuit board 130, which will be discussed in more detail below, although not all of the circuit board or its components need to be located in the larger diameter section. Circuit board housing 140 may or may not be vented to the atmosphere. In particular implementations, circuit board housing 140 may be electrically coupled to a ground line of circuit board 130 to provide increased noise resistance for the circuit board.

Pressure measurement system 100 further includes an electrical connector 150, a system housing 160, and a gasket 170. Electrical connector 150 is coupled to system housing 160 and is electrically coupled to circuit board 130. In particular implementations, electrical connector 150 and system housing 160 may be composed of an electrically insulating material. In the illustrated implementation, electrical connector 150 is integral with system housing 160. System housing 160 is also coupled to pressure inlet joint 110 (e.g., by caulking, crimping, or welding). System housing 160, in conjunction with pressure inlet joint 110, encloses circuit board housing 140. Gasket 170 interfaces with system housing 160 and pressure inlet joint 110 for preventing intrusion of moisture and dust from the outside.

In operation, pressure inlet joint 110 is coupled (e.g., screwed and sealed) to a process for which a pressure is to be measured and allows pressure of a fluid to enter passage 112 and arrive at chamber 114. Based on the pressure in chamber 114, diaphragm 122 deforms, and strain gauge 124 senses the pressure as a strain and converts the pressure to an electrical signal, which is conveyed to circuit board 130. Circuit board 130 conditions (e.g., filters and amplifies) the electrical signal, which is then conveyed to electrical connector 150. Electrical connector 150 conveys the signal outside of system housing 160, so that the signal may be provided to a remote device.

Figure 2:
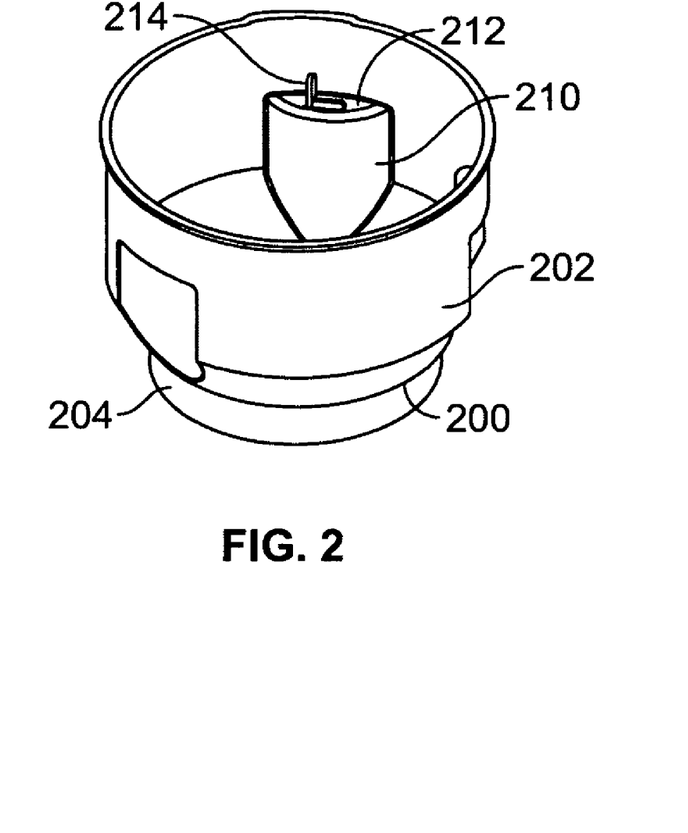
FIG. 2 is a perspective view showing an example of a circuit board housing for the system in FIG. 1.
Figure 3:
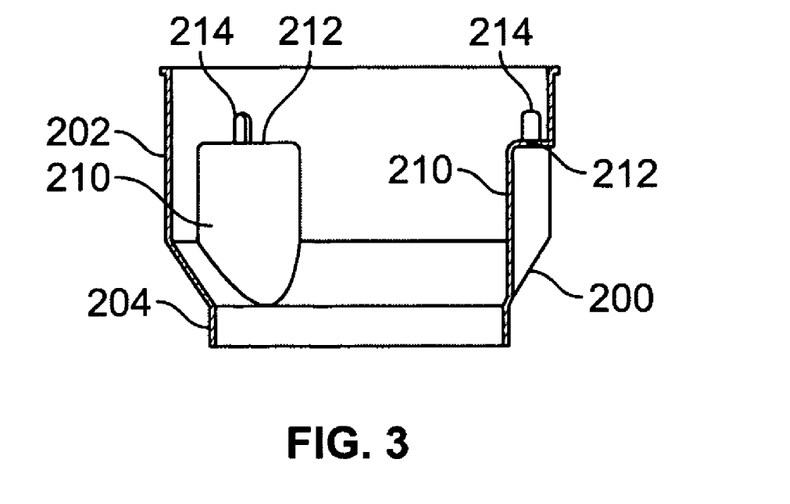
FIG. 3 is a side cross-sectional view of the circuit board housing in FIG. 2.

FIGS. 2-3 illustrate an example of circuit board housing 140—circuit board housing 200. Circuit board housing 200 includes a larger diameter section 202 and a smaller diameter section 204. Circuit board housing 200 may be composed of tin-plated soft steel, stainless steel, which may be matched to the pressure inlet joint, soft steel that may be readily formed, copper-based metal having good electrical characteristics, or any other appropriate material. Smaller diameter section 204 may engage a pressure inlet joint and be coupled thereto at a number of points (e.g., by spot welding).

Circuit board housing 200 also includes three column sections 210. Column sections 210 have a substantially semi-circular cross section and extend from smaller diameter section 204 toward larger diameter section 202. The column sections are substantially parallel to the longitudinal axis of the circuit board housing. In other implementations, column sections 210 may have any other appropriate shapes and/or orientations. Each of column sections 210 includes a cover 212, which each includes a projection 214. Covers 212 can support a circuit board, and one or more of projections 214 may be coupled to the circuit board. Also, one or more of projections 214 may be electrically coupled to a ground line for the circuit board. The electrically-coupled projections may provide part of an electrical path from the circuit board to the pressure inlet joint. In particular implementations, the circuit board housing may complete the path to the pressure inlet joint, and a ground line of the circuit board may be coupled to a projection via a capacitor and/or a varistor. In particular implementations, the projections are arranged at unequal intervals around the housing.

In one mode of operation, a circuit board is installed and supported on covers 212. The circuit board is then coupled to projections 214 (e.g., by engagement or soldering techniques). At least one of the couplings may allow a ground line of the circuit board to be electrically coupled to a projection. When coupling one of projections 214 to the circuit board, the projection may be pressed against a ground pad on the circuit board and bent thereon for engagement. In certain implementations, however, joint by soldering is preferable because of increased reliability.

Figure 4:
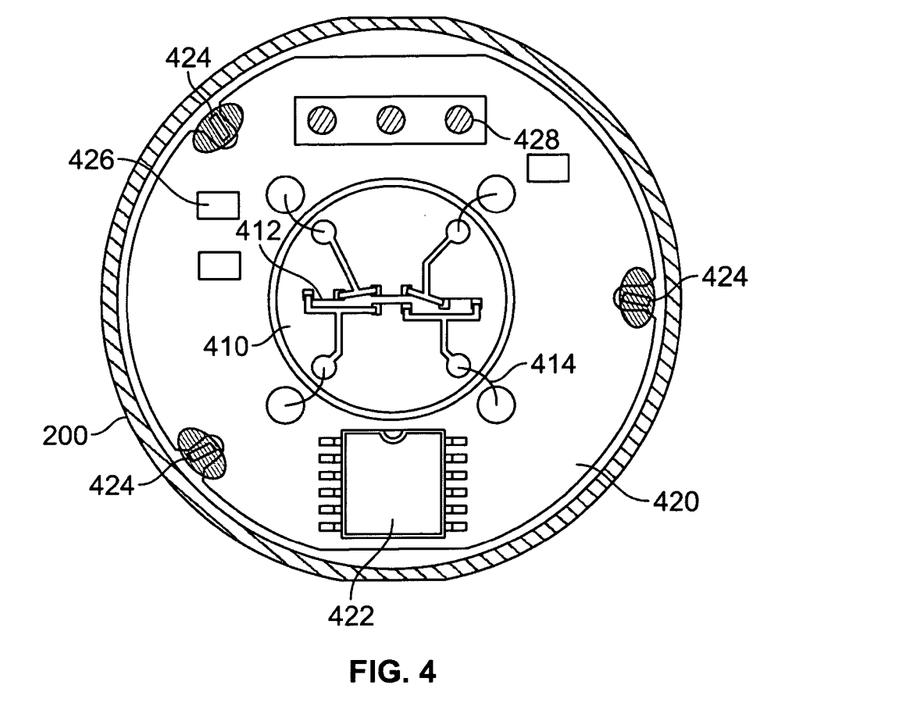
FIG. 4 is a top cross-sectional view showing an example of the circuit board housing in FIG. 2 in relationship to a pressure detecting component and a circuit board.

FIG. 4 illustrates circuit board housing 200 engaged with a pressure detecting component 410 and a circuit board 420, which may be similar to pressure detecting component 120 and circuit board 130, respectively, of system 100. As illustrated, circuit board 420 is coupled to circuit board housing 200, and electrodes of a strain gauge arrangement 412 of pressure detecting component 410 are electrically coupled to electrodes of circuit board 420 by wire bonding 414. Although the pressure detecting component is directly connected to the circuit board by wire bonding in the illustrated implementation, a configuration may be employed in which the pressure detecting component is connected via a lead frame to the circuit board.

Circuit board 420 also includes an amplifier 422, solder joints 424, a capacitor 426, and an input/output terminal 428. Amplifier 422 may, for example, be an integrated circuit. In operation, an electrical signal that is generated by pressure detecting component 410 and conditioned (e.g., amplified) by circuit board 420 is provided to input/output terminal 428, from which it may be sent via a relay board to an electrical connector for an external device. Input/output terminal 428 may serve as the basis of an amplified output (e.g., 0-5 Vdc ratiometric, 4-20 mA, and 0-10 Vdc).

This implementation of circuit board housing 140 has a variety of features. For example, when the circuit board is tightly coupled to the circuit board housing (e.g., by soldering), and the circuit board housing is tightly coupled to a pressure inlet joint with a pressure detecting component fixed thereon, a fixed portion of the circuit board is less susceptible to breaking. This allows a pressure measurement system with high reliability to be obtained. As another example, a ground terminal of the circuit board may be electrically coupled to a pressure inlet joint via the circuit board housing, which provides good grounding of the circuit board and an improvement in noise resistance. In particular implementations, an AC component superimposed on a DC power supply line can be released to the earth. Also, this electrical coupling may be realized by soldering and welding, increasing the reliability of the coupling and reducing structural changes that may occur during the passage of time, which allows the noise resistance property to be maintained for a longer period of time. As an additional example, by fixing the circuit board housing to a pressure inlet joint by spot welding, an improvement in strength may be obtained. This increases reliability by providing a pressure measurement system capable of maintaining performance even in an environment in which vibration or impacts may occur. As a further example, the area for mounting components on the rear surface of the circuit board is increased because the circuit board is coupled to the circuit board housing in the larger diameter section and the housing does not support the circuit board around its entire periphery. Also, when the component mounting area is secured, a diameter of the circuit board does not have to increase, and, as a result, the diameter of the pressure sensor does not have to increase. Further, by managing the height of covers 212, the height of the circuit board can readily be managed.

As another example, since column sections 210 are arranged in parallel to the longitudinal axis of the circuit board housing from the smaller diameter section to the larger diameter section, fabrication by press working can readily be performed. Namely, pressing work in the lateral direction in addition to processing in the vertical direction may be avoided. This may allow not only a less complicated structure of a die, but also easier die maintenance and increased press working speed, not to mention increased construction consistency. The pressing direction can be realized in the longitudinal direction also in the case of the projections, so that the pressure measurement system can be readily manufactured. Easing processing operations results in the circuit board housing being produced as a low cost member.

As an additional example, the circuit board is coupled to the pressure inlet joint through a circuit board housing, which may be securely coupled to the pressure inlet joint. This may provide proper positioning of the circuit board, especially in the rotational direction, and a more lasting coupling, especially in high static or dynamic heat and/or load environments. If a circuit board loses its coupling to a pressure inlet port, disconnection of a wire electrically coupling the circuit board to a pressure detecting component may occur.

As a further example, the circuit board housing may be made of an electrically conductive material. This may improve the reliability of the circuit board housing and/or the interface between the circuit board housing and the pressure inlet joint by lessening the difference between thermal coefficients of expansion.

Figure 5:
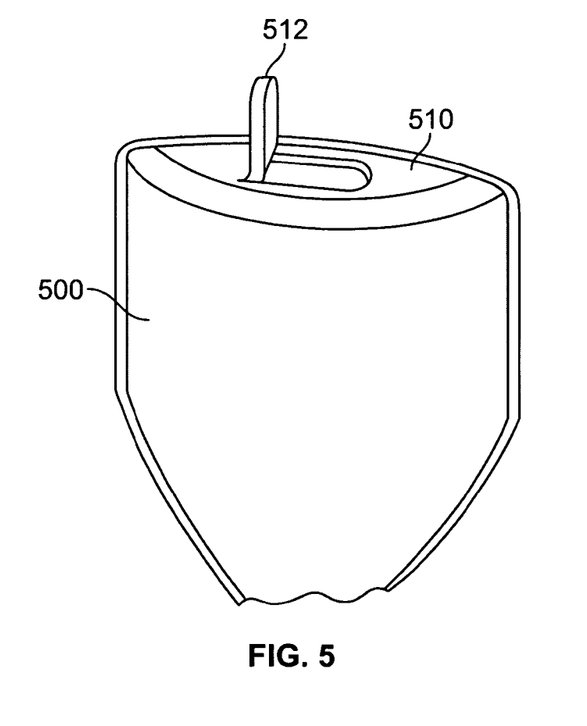
FIG. 5 is a perspective view showing an example of a column section for the circuit board housing in FIG. 2.

FIG. 5 illustrates an example column section 500. Column section 500 is one example of column sections 210 for circuit board housing 200. As with column sections 210, column section 500 includes a cover 510 and a projection 512. Projection 512 is formed by cutting cover 510 and bending the cut portion. In other implementations, a projection may be formed by raising the cover with a form like a ball by a burring processing.

Figure 6:
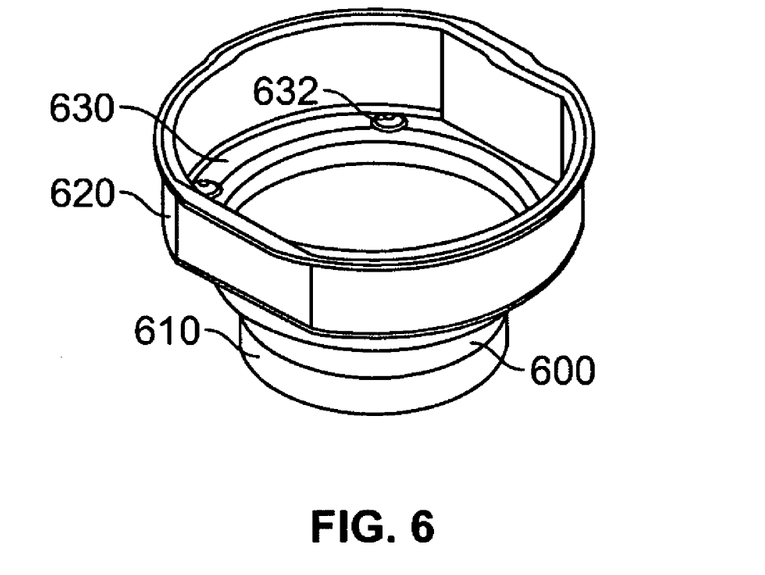
FIG. 6 is a perspective view showing an example circuit board housing.
Figure 7:
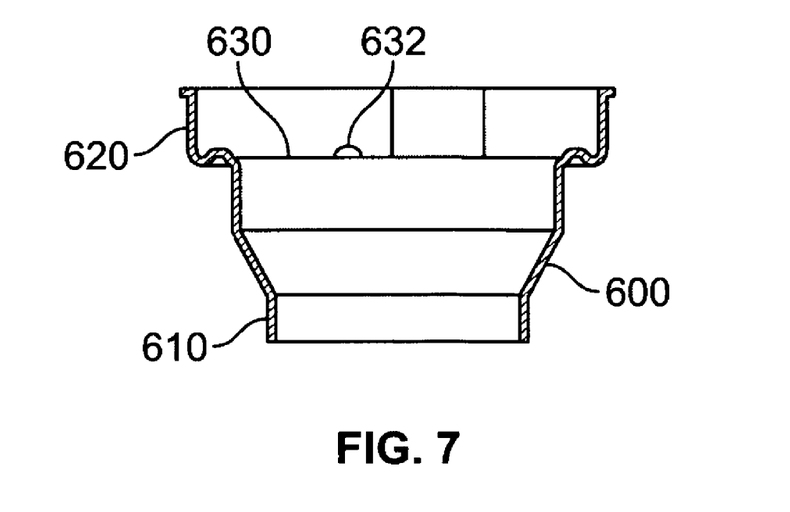
FIG. 7 is side cross-sectional view of the circuit board housing in FIG. 6.

FIGS. 6-7 illustrate another example circuit board housing 600. Circuit board housing 600 includes a smaller diameter section 610 and a larger diameter section 620. A circuit board is held on a step 630 between the larger diameter section and the smaller diameter section. A projection 632 for coupling (e.g., by soldering) to a ground line of a circuit board may be provided according to the necessity. Smaller diameter section 610 may be engaged with a pressure inlet joint at multiple points and coupled thereto by spot welding (e.g., resistance welding or laser welding).

Figure 8:
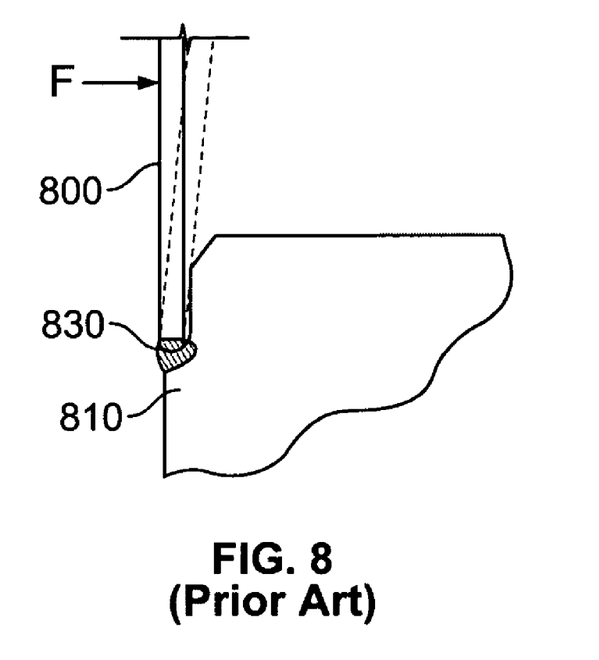
FIG. 8 is a side cross-sectional view showing a circuit board housing and a pressure inlet joint coupled by seam welding.

FIG. 8 illustrates a conventional technique for coupling a circuit board housing 800 and a pressure inlet joint 810. Circuit board housing 800 and pressure inlet joint 810 may be similar to circuit board housing 140 and pressure inlet joint 110 of system 100.

As illustrated, circuit board housing 800 and a pressure inlet joint 810 are coupled to each other by using seam welding, along a weld portion 830. A clearance is provided between circuit board housing 800 and pressure inlet joint 810. But when welding is performed in the weld portion 830 in this state, a force F in the lateral direction results in the stress being received by weld portion 830. Generally, a circuit board housing does not require high strength and, therefore, is commonly made with an iron plate with a thickness of approximately 0.5 mm or below by using press working techniques. Thus, the welded portion is integrated relatively weakly, and, as a result, the welded portion may easily break when a force F is loaded thereto.

Figure 9:
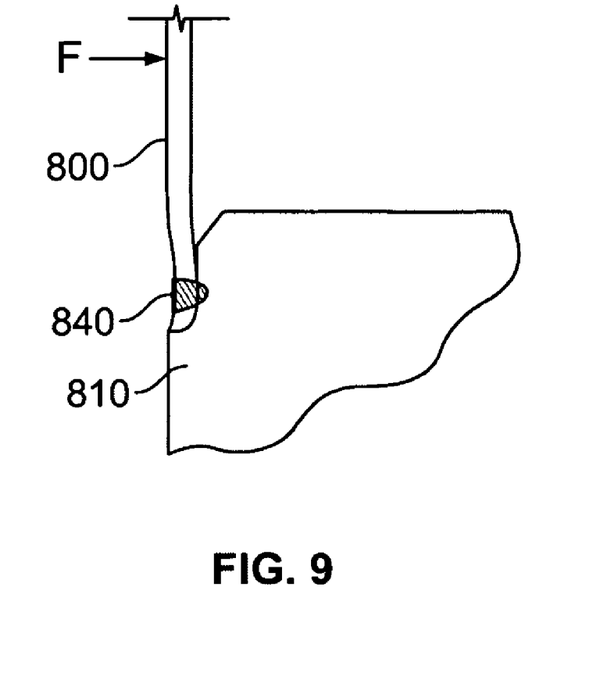
FIG. 9 is a side cross-sectional view showing a circuit board housing and a pressure inlet joint coupled by spot welding.

FIG. 9 illustrates another technique for coupling a circuit board housing 800 and a pressure inlet joint 810. As illustrated, circuit board housing 800 and pressure inlet joint 810 are coupled to each other by using spot welding, at a number of weld sections 840 (only one of which is shown). When spot welding is performed at the welding sections 840, circuit board housing 800 deforms slightly inward at the sections. Because of this feature, when a force F is applied to the circuit board housing, the section as a whole receives the force, so the stress is not concentrated at the welded section. This may result in the weld sections resisting breakage.

A number of implementations of the invention have been described, and a number of other implementations have been mentioned or suggested. Nevertheless, it will be understood that various additions, deletions, substitutions, and/or modifications may be made while still achieving pressure measurement. For these reasons, the invention is to be measured by the scope of the appended claims, which may include one or more of the implementations.

The invention claimed is:

1. A pressure measurement system, the system comprising:
    a pressure inlet joint adapted to introduce a pressure of a fluid;
    a pressure detecting component coupled to the pressure inlet joint;
    a circuit board coupled to the pressure detecting component and adapted to condition an electrical signal from the pressure detecting component; and
    a circuit board housing separate from the pressure inlet joint, the circuit board housing at least partially enclosing the pressure detecting component and coupled to the circuit board, the circuit board housing consisting essentially of a unitary body of thin, homogeneous metallic material and having a substantially circular cross-section, the circuit board housing comprising a larger diameter section and a smaller diameter section, the smaller diameter section coupled to the pressure inlet joint, the circuit board located in the circuit board housing and at least in part in the larger diameter section.

2. The pressure measurement system according to claim 1, wherein the circuit board housing comprises a plurality of columns formed toward and substantially parallel to the axis of revolution of the circuit board housing, each column including an end engaged with the circuit board.

3. The pressure measurement system according to claim 2, wherein the columns are substantially semi-cylindrical and extend substantially parallel to the axis of revolution of the circuit board housing from the smaller diameter section toward the larger diameter section.

4. The pressure measurement system according to claim 2, wherein the circuit board housing further comprises a projection formed on the end of at least one column, the projection engaged with the circuit board.

5. The pressure measurement system according to claim 4, wherein the circuit board housing composes a projection formed on the end of each column the projections being arranged at unequal intervals around the axis of revolution of the circuit board housing.

6. The pressure measurement system according to claim 4, wherein the projection is electrically coupled to a ground line of the circuit board.

7. The pressure measurement system according to claim 6, wherein the projection is electrically coupled to the pressure inlet joint.

8. The pressure measurement system according to claim 1, further comprising an electrical connector electrically coupled to the circuit board for connection to an external device.

9. The pressure measurement system according to claim 1, wherein the smaller diameter section of the circuit board housing is structurally integrated with the pressure inlet joint by spot welding at a plurality of points.

10. The pressure measurement system according to claim 9, wherein at least part of the smaller diameter section parallel to the axis of revolution of the circuit board housing engages the pressure inlet joint, and the welds occur in this part.

11. The pressure measurement system according to claim 1, further comprising a second housing at least partially enclosing the circuit board housing, the second housing coupled to the pressure inlet joint.

12. A circuit board housing for a pressure measurement system, the circuit board housing adapted to at least partially enclose a pressure detecting component and comprising a plurality of columns formed toward and substantially parallel to the axis of revolution of the circuit board housing, each column including an end adapted to engage with a circuit board housed by the circuit board housing, the circuit board housing consisting essentially of a unitary body of thin, homogeneous metallic material and having a substantially circular cross-section, the circuit board housing comprising a larger diameter section and a smaller diameter section, the smaller diameter section adapted to couple to a pressure inlet joint.

13. The pressure measurement system of claim 12, wherein the metallic material has a maximum thickness of approximately one-fiftieth of an inch, and the outer dimensions of the circuit board housing are less than approximately one inch.

14. The circuit board housing according to claim 12, wherein the columns are substantially semi-cylindrical and extend substantially parallel to the axis of revolution of the circuit board housing from the smaller diameter section toward the larger diameter section.

15. The circuit board housing according to claim 12, wherein the circuit board housing further comprises a projection formed on the end of at least one column, the projection adapted to engage a circuit board housed by the circuit board housing.

16. The circuit board housing according to claim 15, wherein the circuit board housing comprises a projection formed on the end of each column, the projections being arranged at unequal intervals around the axis of revolution of the circuit board housing.

17. The circuit board housing according to claim 15, wherein the projection is adapted to be electrically coupled to a ground line of a circuit board housed by the circuit board housing.

18. The circuit board housing according to claim 12, wherein the smaller diameter section is adapted to be structurally integrated with a pressure inlet joint by spot welding at a plurality of points.

19. The circuit board housing according to claim 18, wherein at least part of the smaller diameter section parallel to the axis of revolution of the circuit board housing can engage the pressure inlet joint, and the welds occur in this part.

20. A pressure measurement system comprising:
a pressure inlet joint adapted to introduce a pressure of a fluid;
a pressure detecting component coupled to the pressure inlet joint;
a circuit board coupled to the pressure detecting component and adapted to amplify an electrical signal from the pressure detecting component;
a circuit board housing separate from the pressure inlet joint, the circuit board housing partially enclosing the pressure detecting component and engaging the circuit board, the circuit board housing consisting essentially of a unitary body of thin, homogeneous, integral metallic material and having a substantially circular cross-section and comprising:
a larger diameter section,
a smaller diameter section, the smaller diameter section structurally integrated with the pressure inlet joint by spot welding at a plurality of points along at least part of the smaller diameter section parallel to the axis of revolution of the circuit board housing that engages the pressure inlet joint, and
a plurality of substantially semi-cylindrical columns formed from the circuit board housing, the columns formed toward and substantially parallel to the axis or revolution of the circuit board housing and extending substantially parallel to the axis of revolution of the circuit board housing from the smaller diameter section toward the larger diameter section, each column including a cover having a projection formed therefrom and engaged with the circuit board by soldering, the projections arranged at unequal intervals around the axis of revolution of the circuit board housing, the circuit board located in the circuit board housing and in the larger diameter section by the projections, at least one of the projections electrically coupled to a ground line of the circuit board and to the pressure inlet joint;
a housing partially enclosing the circuit board housing, the housing coupled to the pressure inlet joint; and
an electrical connector electrically coupled to the circuit board for connection to an external device.

21. The pressure measurement system according to claim 1, wherein the mass of the metallic material of the circuit board housing facilitates soldering of the circuit board housing to the circuit board.

22. The pressure measurement system according to claim 2, wherein the columns are formed from the circuit board housing.

23. The pressure measurement system according to claim 4, wherein the projection is formed from the column.

24. The pressure measurement system according to claim 4, wherein the projection is engaged with the circuit board by soldering, brazing, or welding.

25. The circuit board housing according to claim 12, wherein the mass of the metallic material of the circuit board housing facilitates soldering of the circuit board housing to a circuit board housed by the circuit board housing.

26. The circuit board housing of claim 13, wherein the columns arc formed from the circuit board housing.

27. The circuit board housing of claim 15, wherein the projection is formed from the column.

28. The pressure measurement system according to claim 15, wherein the projection is adapted to engage a circuit board by soldering, brazing, or welding.

29. The pressure measurement system of claim 1, wherein the circuit board housing consists of an integral piece of the metallic material.

30. The pressure measurement system of claim 1, wherein the metallic material has a maximum thickness of approximately one-fiftieth of an inch, and the outer dimensions of the circuit board housing are less than approximately one inch.

31. The pressure measurement system of claim 12, wherein the circuit board housing consists of an integral piece of the metallic material.

* * * * *

UNITED STATES PATENT AND TRADEMARK OFFICE
CERTIFICATE OF CORRECTION

PATENT NO. : 7,270,010 B2 Page 1 of 1
APPLICATION NO. : 10/928024
DATED : September 18, 2007
INVENTOR(S) : Yoshikazu Kaneko et al.

It is certified that error appears in the above-identified patent and that said Letters Patent is hereby corrected as shown below:

Title Pg, Item (75), (Inventors), please delete "Shelton, UT" and insert --Shelton, CT--.

In Column 8, Line 38, Claim 5, please delete "composes" and insert --comprises--.

In Column 8, Line 39, Claim 5, please delete "column" and insert --column,--.

In Column 10, Line 8, Claim 20, please delete "or" and insert --of--.

In Column 10, Line 41, Claim 26, please delete "claim 13" and insert --claim 12--.

In Column 10, Line 42, Claim 26, please delete "arc" and insert --are--.

Signed and Sealed this

Twenty-sixth Day of May, 2009

JOHN DOLL
*Acting Director of the United States Patent and Trademark Office*